United States Patent
Eriksson et al.

(10) Patent No.: US 9,913,259 B2
(45) Date of Patent: Mar. 6, 2018

(54) METHODS, NETWORK NODES AND USER EQUIPMENTS IN A WIRELESS NETWORK FOR COMMUNICATING AN EPDCCH

(71) Applicant: Telefonaktiebolaget L M Ericsson (publ), Stockholm (SE)

(72) Inventors: Erik Eriksson, Linköping (SE); Mattias Frenne, Uppsala (SE); David Hammarwall, Vallentuna (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 939 days.

(21) Appl. No.: 13/885,520

(22) PCT Filed: Mar. 27, 2013

(86) PCT No.: PCT/SE2013/050340
§ 371 (c)(1),
(2) Date: May 15, 2013

(87) PCT Pub. No.: WO2014/051487
PCT Pub. Date: Apr. 3, 2014

(65) Prior Publication Data
US 2014/0092826 A1    Apr. 3, 2014

Related U.S. Application Data

(60) Provisional application No. 61/707,555, filed on Sep. 28, 2012.

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2013/0003673 A1* | 1/2013 | Dinan ............... | H04W 72/0406 370/329 |
| 2013/0039291 A1* | 2/2013 | Blankenship et al. ........ | 370/329 |

(Continued)

FOREIGN PATENT DOCUMENTS

WO    2013046471 A1    4/2013

OTHER PUBLICATIONS

3rd Generation Partnership Project. 3GPP TS 36.213 V11.0.0 (Sep. 2012). 3rd Generation Partnership Project; Technical Specification Group Radio Access Network; Evolved Universal Terrestrial Radio Access (E-UTRA); Physical layer procedures (Release 11). Sep. 2012, pp. 1-143.

(Continued)

*Primary Examiner* — Edan Orgad
*Assistant Examiner* — Rebecca Song
(74) *Attorney, Agent, or Firm* — Murphy, Bilak & Homiller, PLLC

(57) ABSTRACT

A network node in a wireless communication network communicates an enhanced Physical Downlink Control Channel (ePDCCH) to a user equipment (UE). This begins with the transmission, to the UE, of a configuration message that indicates the mappings of eDPCCH onto resource elements for both a first eDPCCH set and a second eDPCCH set. The mapping for the first eDPCCH set avoids the use of resource elements already in use by a first type of signal (e.g., a Cell-Specific Reference Signal or CRS), whereas the (Continued)

mapping for the second eDPCCH set avoids the use of resource elements in use by a second type of signal. The choice of an eDPCCH set for transmitting data to a UE may then be dynamically made in order to avoid interference caused by the first or second types of signal.

24 Claims, 7 Drawing Sheets

(56) References Cited

U.S. PATENT DOCUMENTS

| | | | |
|---|---|---|---|
| 2013/0194931 A1* | 8/2013 | Lee | H04L 5/0053 370/241 |
| 2013/0195067 A1* | 8/2013 | Khoshnevis | H04L 5/0094 370/330 |
| 2013/0242904 A1* | 9/2013 | Sartori et al. | 370/329 |
| 2014/0036789 A1* | 2/2014 | Miao et al. | 370/329 |
| 2014/0036806 A1* | 2/2014 | Chen et al. | 370/329 |

OTHER PUBLICATIONS

3rd Generation Partnership Project. 3GPP TS 36.211 V11.2.0 (Feb. 2013). 3rd Generation Partnership Project; Technical Specification Group Radio Access Network; Evolved Universal Terrestrial Radio Access (E-UTRA); Physical Channels and Modulation (Release 11). Feb. 2013, pp. 1-109.

3rd Generation Partnership Project. "Mapping of ePDCCH to RE." 3GPP TSG-RAN WG1 #70bis, R1-124149, Oct. 8-12, 2012, pp. 1-6, San Diego, USA.

3rd Generation Partnership Project. "ePDCCH start symbol configuration." 3GPP TSG-RAN WG1 #70bis, R1-124152, Oct. 8-12, 2012, San Diego, USA.

Unknown, Author. "Indication to the UE with ePDCCH Resources." ZTE Corporation. 3GPP TSG RAN WG1 Meeting #70. R1-123316. Qingdao, China. Aug. 13-17, 2012. 1-2.

Einhaus et al. "Performance Study of an Enhanced Downlink Control Channel Design for LTE." IEEE 2012. 1-5.

Unknown, Author. "Remaining aspects of DMRS for ePDCCH." New Postcom. 3GPP TSG RAN WG1 Meeting #70. R1-123441. Qingdao, China. Aug. 13-17, 2012. 1-3.

Unknown, Author. "Search space design for ePDCCH." Renesas Mobile Europe Ltd. 3GPP TSG-RAN WG1 Meeting #70. R1-123586. Qingdao, China. Aug. 13-17, 2012. 1-7.

Unknown, Author, "Allocation of ePDCCH resources", Ericsson, ST-Ericsson, 3GPP TSG-RAN WG1 #70, R1-123615, Qingdao, China, Aug. 13-17, 2012, 1-3.

Unknown, Author, "Details of multiplexing of DCI messages", Ericsson, ST-Ericsson, 3GPP TSG-RAN WG1 #68bis, R1-121023, Jeju, Republic of Korea, Mar. 26-30, 2012, 1-3.

* cited by examiner

METHODS, NETWORK NODES AND USER EQUIPMENTS IN A WIRELESS NETWORK FOR COMMUNICATING AN EPDCCH

TECHNICAL FIELD

The present disclosure relates generally to a method performed by a network node and a network node, for communicating an enhanced Physical Downlink Control Channel, ePDCCH, to a user equipment, UE. The disclosure also relates to a method performed by a UE and a UE, for communicating an ePDCCH with a network node. Further, the disclosure relates to computer programs and computer program products which when run in a network node or a UE, causes the network node or the UE to perform the method mentioned above.

BACKGROUND

3GPP Long Term Evolution, LTE, technology is a mobile broadband wireless communication technology in which transmissions from base stations, referred to as eNBs, to mobile stations, referred to as user equipments, UEs, are sent using orthogonal frequency division multiplexing, OFDM. OFDM splits the signal into multiple parallel sub-carriers in frequency. The basic unit of transmission in LTE is a resource block, RB, which in its most common configuration consists of 12 subcarriers and 7 OFDM symbols, which is the same as one slot. A unit of one subcarrier and one OFDM symbol is referred to as a resource element, RE. Thus, an RB consists of 84 REs. An LTE radio subframe is composed of multiple resource blocks in frequency with the number of RBs determining the bandwidth of the system and two slots in time. Furthermore, the two RBs in a subframe that are adjacent in time are denoted as an RB pair. In the time domain, LTE downlink transmissions are organized into radio frames of 10 ms, each radio frame consisting of ten equally-sized subframes of length Tsubframe=1 ms.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols, RS that are transmitted on the downlink. These reference symbols and their position in the time-frequency grid are known to the UE and hence can be used to determine channel estimates by measuring the effect of the radio channel on these symbols.

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on.

In LTE Rel-8, the first one to four OFDM symbols, depending on the configuration, in a subframe are reserved to contain such control information. Furthermore, in LTE Rel-11, an enhanced physical downlink control channel was introduced, ePDCCH, in which PRB pairs are reserved to exclusively contain ePDCCH transmissions, although excluding from the PRB pair the one to four first symbols that may contain control information to UEs of releases earlier than Rel-11. FIG. 1 shows a downlink subframe of 10 RB pairs. The subframe is configured with three ePDCCH regions (marked with black) of size 1 PRB pair each. The remaining PRB pairs may be used for PDSCH transmissions.

Hence, the ePDCCH is frequency multiplexed with data messages, i.e. with Packet Data Shared Channel, PDSCH, transmissions contrary to the physical downlink control channel, PDCCH, which is time multiplexed with PDSCH transmissions. Note also that multiplexing of PDSCH and any ePDCCH transmission within a PRB pair is not supported in LTE Rel-11.

Furthermore, two modes of ePDCCH transmission is supported, localized and distributed ePDCCH transmission.

In distributed transmission, an ePDCCH is mapped to resource elements in an EPDCCH set, containing N PRB pairs, where N=2, 4, or 8. In this way, frequency diversity can be achieved for the ePDCCH message. FIG. 2 shows a downlink subframe with 4 parts belonging to an ePDCCH. The parts are mapped to multiple of the enhanced control regions known as PRB pairs, to achieve distributed transmission and frequency diversity.

In localized transmission, an ePDCCH is mapped to one PRB pair only, if the space allows, which is always possible for aggregation level one and two and for normal subframes and normal Cyclic Prefix, CP, length also for aggregation level four. In case the aggregation level of the ePDCCH is too large, a second PRB pair is used as well, and so on, using more PRB pairs, until all enhanced Control Channel Elements, eCCE, belonging to the EPDCCH has been mapped. FIG. 3 shows a downlink subframe where the 4 eCCEs belonging to an ePDCCH is mapped to one of the enhanced control regions, to achieve localized transmission.

To facilitate the mapping of eCCEs to physical resources each PRB pair is divided into 16 enhanced resource element groups and each eCCE is split into L=4 or L=8 enhanced Resource Element Groups, eREGs, for normal and extended cyclic prefix, respectively. An ePDCCH is consequently mapped to a multiple of four or eight eREGs depending on the aggregation level.

These eREGs belonging to an ePDCCH resides in either a single PRB pair, as is possible for localized transmission, or a multiple of PRB pairs, as is possible for distributed transmission. The division of a PRB pair into eREGs is illustrated in FIG. 4, which shows a PRB pair of normal cyclic prefix configuration in a normal subframe. Each tile is a resource element where the number corresponds to the eREG it is grouped within. The marked REs with 0, corresponds to the REs belonging to the same eREG indexed with 0.

Furthermore, how L=4 or L=8 eREGs respectively are grouped into the eCCEs is described in [3GPP TS 36.213].

The ePDCCH resources may be UE specifically configured in terms of ePDCCH sets. An ePDCCH set is a collection of N PRB pairs containing 16N/L eCCE with the possible values of N=2, 4, 8. A UE can be configured with K=1 or K=2 sets simultaneously and where the value N can be different for each of the K sets. Each set may also be configured to be of either localized or distributed type. For example, a UE may be configured with K=2 and $N_1$=4 and $N_2$=8 and where the first set is used for localized transmission and the second for distributed transmission. The total number of blind decodes, 32 in the case uplink multiple-input multiple-output, MIMO, is not configured, is split between the K sets. How this split is done is described in 3GPP [TS 36.213]. Hence, a UE will monitor $B_i$ ePDCCH candidates in ePDCCH set i.

Each ePDCCH consists of AL eCCEs where AL is the aggregation level of the message. Each eCCE in turn consists of L eREG where L=4 or L=8. An eREG is a group of RE which is defined in 3GPP specification TS 36.211. In each PRB pair there is 16 eREG. When ePDCCH collides in mapping with own cell Cell-specific Reference Signal, CRS, or own cell legacy control region, these signals have priority and ePDCCH is mapped around these occupied REs and code chain rate matching is applied. This means that the effective number of available RE per eREG is usually less than the 9 RE but there is no interference from the own cell CRS or own legacy control region signals since the ePDCCH is mapped around these signals.

The cell-specific reference signal, also known as the common reference signal, is broadcasted periodically by LTE systems to provide a UE the ability to measure the channel used for certain downlink transmissions. The CRS is, for example, used to demodulate the Physical Broadcast Channel, PBCH, but also to demodulate the PDSCH for, for example, transmission modes 1-4, which are the transmission modes that are primarily used for communication to any LTE Rel-8 and Rel-9 UE. For these transmission modes, the CRS is also utilized for the purpose of channel state information, CSI, measurements, which are reported to the network for improved link adaptation and MIMO downlink processing. Another application of CRS is for mobility measurements.

Between cells, the CRS may be shifted in frequency domain. This is often used in real-life deployments including conventional homogenous deployments with macro nodes.

The different antenna ports of the CRS are mapped to different sets of resource elements in the grid. Moreover, for all resource elements assigned to a CRS port, the corresponding resource elements may be muted, zero-power, on all other antenna ports. The overhead of the CRS thus increases with increasing number of transmitter antenna ports, 8, 16, and 24 resource elements per PRB pair, for 1, 2 and 4 antennas, i.e. CRS antenna ports, respectively.

The same enhanced control region, see for example FIG. 3, can be used in different transmission points within a cell or belong to different cells that are not highly interfering with each other.

To reduce interference between different transmission points, various interference coordination techniques may be used, such as enhanced Inter-cell interference coordination, eICIC, or Coordinated Multi Point, CoMP, operation introduced in LTE Rel-11.

A heterogeneous network comprises a number of low-power network nodes and a number of high-power network nodes, which coverage areas may overlap each other partially and/or totally. A low-power network node is a node providing coverage to a small area, such as a pico node, e.g. a pico eNB. A high-power network node is a node providing coverage to an area larger than the small area, such as a macro node, e.g. a macro eNB. To increase the UE pick-up area of a low-power node (i.e., the area in which a UE would connect a pico node rather than a high power macro node), cell range expansion, CRE, is a powerful tool where a UE is prevented to make a handover to the high-power node unless the received power from the high-power node exceeds the received power of the low-power node by a configured CRE margin. This effectively increases the "coverage area" of the low-power node. However, for UEs in the so-called cell-range expansion area, i.e., the area where UEs connect to the low-power node, but signals from the high-power node are received with a stronger power than signals from the low-power node, it is advantageous that the high-power node minimizes the interfering signals in the subframes where the network communicates with these UEs.

However, not all interference from the high-power node can be muted in a subframe, such as the transmission of the CRS. In particular, for cell-range expansion UEs to be able to accurately estimate a propagation channel based on the CRS transmitted by the low-power node, it is advantageous that the CRS of the macro node does not collide with the CRS of the low-power node. This can be ensured by configuring different CRS shift in frequency of the high-power node and the low-power node.

Today, mapping of ePDCCH is performed such that the ePDCCH is mapped around other signals, e.g. CRS or CSI-RS, of the same cell as in which the ePDCCH is distributed, i.e. serving cell. In other words, the resource elements, REs, used by the ePDCCH are not coinciding with the REs used by the other signals of the same cell. Thereby, there is no collision of the ePDCCH with the CRSs of the same, serving, cell. The UE is implicitly informed on which REs the other signals are situated. As an example, CRS positions are given by the Cell-ID and CSI-RS is given by UE specific signaling using the RRC protocol. However, it has been discovered that there are use cases where other mappings may be needed, where REs different than those occupied by the CRS and CSI-RS transmitted by the serving cell need to be mapped around. For example, in heterogeneous networks using CRE, a UE may be situated in the CRE area and connected to a low-power node, and experience high interference from a signal of a high-power network node. In that case, the signal of the high-power node may need to be avoided in the ePDCCH mapping in the serving cell of the low-power node, but if the UE is situated closer to the low-power node, the signal from the low-power node is the strongest and needs instead to be avoided.

SUMMARY

It is an object of the invention to address at least some of the problems and issues outlined above. It is an object to decrease interference for ePDCCH signals. It is another object to decrease interference for ePDCCH signals from other signals than CRS and CSI-RS of the serving cell. It is another object to enable dynamic allocation/mapping of an ePDCCH to REs. It is possible to achieve these objects and others by using methods, network nodes, UEs and computer programs as defined in the attached independent claims.

According to a first aspect, a method performed by a network node of a wireless communication network is provided. The method is for communicating an enhanced Physical Downlink Control Channel, ePDCCH, to a user equipment, UE. The method comprises transmitting a configuration message to the UE. The configuration message comprises an indication of a first mapping of the ePDCCH to resource elements belonging to a first ePDCCH set, where the resource elements of the first ePDCCH set are different from resource elements used for a first type of signal The configuration message further comprises an indication of a second mapping of the ePDCCH to resource elements belonging to a second ePDCCH set, where the resource elements of the second ePDCCH set are different from resource elements used for a second type of signal, thereby enabling dynamically mapping ePDCCH to the resource elements of the first ePDCCH set or the second ePDCCH set.

According to a second aspect, a network node of a wireless communication network is provided. The network node is configured for communicating an ePDCCH to a UE.

The network node comprises a transmitting unit for transmitting a configuration message to the UE. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal, thereby enabling dynamically mapping ePDCCH to the resource elements of the first ePDCCH set or the second ePDCCH set.

According to a third embodiment, a computer program is provided comprising computer readable code means, which when run in a network node causes the network node to perform the step of transmitting a configuration message to the UE. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal, thereby enabling dynamically mapping ePDCCH to the resource elements of the first ePDCCH set or the second ePDCCH set.

According to a fourth embodiment, a method performed by a UE in a wireless communication network is provided. The method is for communicating an ePDCCH, with a network node. The method comprises receiving a configuration message from the network node. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal.

According to a fifth embodiment, a UE is provided in a wireless communication network. The UE is configured for communicating an ePDCCH with a network node. The UE comprises a receiving unit for receiving a configuration message from the network node. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal.

According to a sixth embodiment, a computer program is provided comprising computer readable code means, which when run in a UE causes the UE to perform the step of receiving a configuration message from a network node. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
FIG. 1 is a schematic diagram of a downlink subframe.
Figure 2:
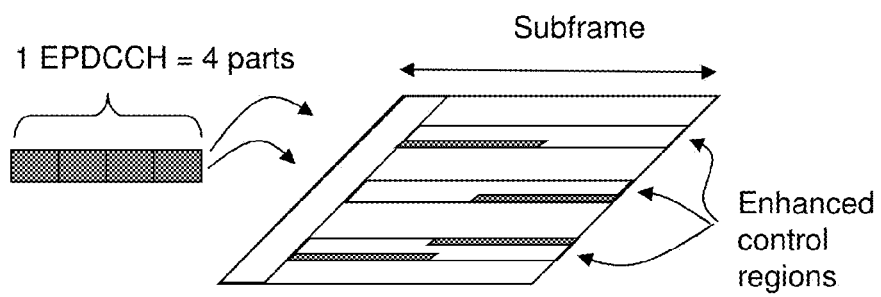
FIG. 2 is another schematic diagram of a downlink subframe.
Figure 3:
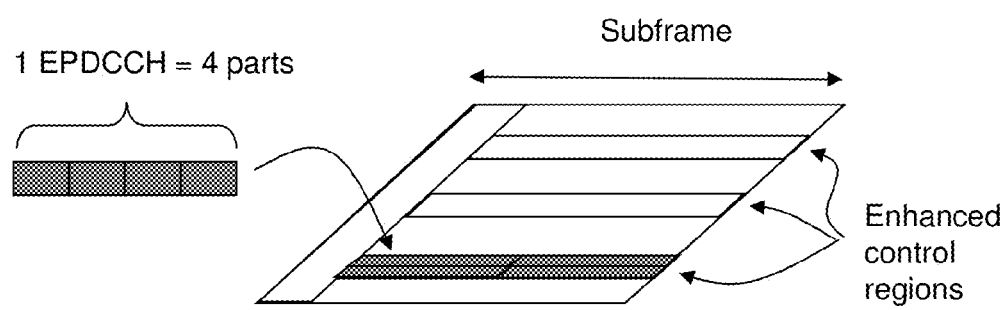
FIG. 3 is a schematic diagram of a downlink subframe.
Figure 4:
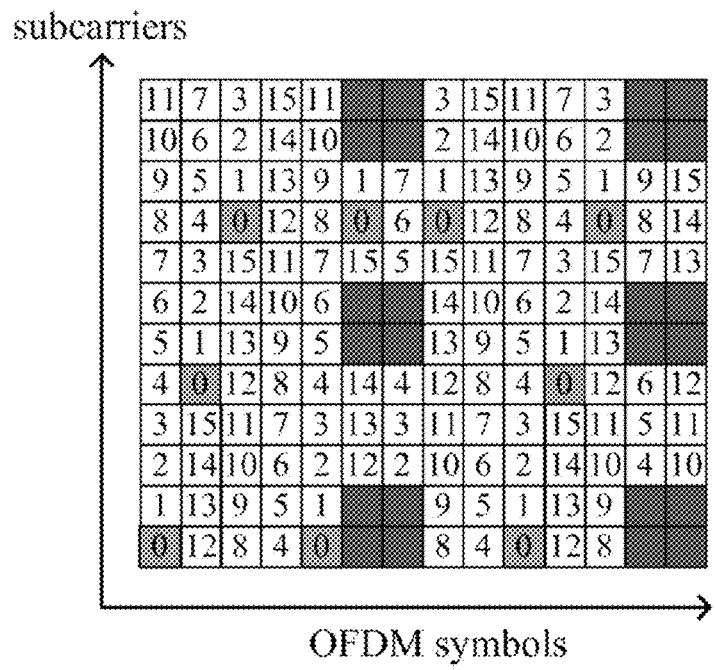
FIG. 4 is a schematic diagram of a mapping scheme for mapping of physical resource blocks to resource elements.

For illustrative purposes, several embodiments of the present invention will be described in the context of a Long-Term Evolution, LTE, system, particularly an LTE system utilizing carrier aggregation. Those skilled in the art will appreciate, however, that several embodiments of the present invention may be more generally applicable to other wireless communication systems, including, for example, WiMax (IEEE 802.16) systems.

Today, mapping of ePDCCH is performed such that the ePDCCH is mapped around other signals, e.g. CRS, CSI-RS or the legacy control region, of the same cell as in which the ePDCCH is distributed, i.e. serving cell. In other words, the resource elements, REs, used by the ePDCCH are not coinciding with the REs used by the other signals of the same cell. Thereby, there is no collision of the ePDCCH with e.g. the CRSs of the same, serving, cell. The UE is implicitly informed on which REs the other signals are situated. As an example, CRS positions are given by the Cell-ID and CSI-RS is given by UE specific signaling using the RRC protocol. However, it has been discovered that there are use cases where other mappings may be needed, where REs different than those occupied by the CRS and CSI-RS transmitted by the serving cell need to be mapped around. For example, in heterogeneous networks using CRE, a UE may be situated in the CRE area and connected to a low-power network node, and experience high interference from a signal of a high-power network node. In that case, the signal of the high-power node may need to be avoided in the ePDCCH mapping in the serving cell of the low-power node, but if the UE is situated closer to the low-power node, the signal from the low-power node is the strongest and needs instead to be avoided.

To be able to cater for such situations, the ePDCCH is, according to an embodiment, dynamically selected to be mapped around one out of a multiple of pre-configured set of REs used for other signals. Dynamic selection of the mapping is possible by associating a certain ePDCCH to RE mapping with an ePDCCH set. As the UE monitors ePDCCH candidates in both sets, the eNodeB can dynamically choose the mapping by selecting the corresponding ePDCCH set for the ePDCCH transmission. An ePDCCH set may be a group of resource elements used for ePDCCH monitoring. According to 3GPP TS 36.213, an ePDCCH set is a group of N=2, 4 or 8 Physical Resource Blocks, PRB, configured for ePDCCH monitoring. The serving eNodeB can then dynamically decide which mapping to use by selecting which ePDCCH set to use for the ePDCCH transmission. In this way the ePDCCH can be mapped around a signal that is considered to be interfering. I.e. the eNodeB configures multiple mappings and thereafter transmits the different mapping configurations to the UE, such that the UE knows where to listen for the ePDCCH. By transmitting information of the mapping configuration to the UE, and associate each mapping with an ePDCCH set, it is possible to dynamically map, or allocate, ePDCCH to REs, around a signal that is problematic for the moment.

In a further aspect of the invention, each of these mappings may correspond to the set of REs used by other signals in two or more different eNodeBs. For instance, two eNodeBs may have different CRS patterns, due to a difference in the number of CRS antenna ports and/or the CRS frequency shift. Also the size of the legacy control region (1, 2 or 3 OFDM symbols) could be different between the two eNodeBs. By this arrangement, with a first ePDCCH set mapping around other signals transmitted from a first eNodeB, and a second ePDCCH set mapping around other signals transmitted from a second eNodeB, the ePDCCH may dynamically be selected to be transmitted from one of the eNodeBs, and have the ePDCCH mapped correspondingly around the other signals of the corresponding eNodeBs. Each eNodeBs is thus associated with one ePDCCH set in this aspect of the invention.

An eNodeB is an example of a network node communicating with a UE.

According to an embodiment, the effects of interference from a nearby cell is reduced by configuring the UE to perform ePDCCH mapping around the "other" signals transmitted in the interfering cell instead of the "other" signals transmitted in the own cell. With "other" signals may be meant other signals than the ePDCCH signal, such as CRS signals. According to another embodiment, dynamic switching of the node used for transmitting ePDCCH can be performed even when participating nodes use different CRS shifts or have different PDCCH control region sizes.

The configuration may be performed per ePDCCH set and may include the number of CRS antenna ports and their location, e.g. frequency shift. The configuration may also include the ePDCCH start symbol so that the ePDCCH can be protected from interference of legacy control transmissions from the interfering cell.

An exemplifying configuration could be K=2 sets of ePDCCH where in a first set, ePDCCH is mapped around transmissions, e.g. CRS transmissions, from the serving node (i.e. first network node) and in a second set, ePDCCH is configured to be mapped around transmissions, e.g. CRS transmissions, from an interfering cell/node (i.e. second network node). When UE is close to its serving node, CRS transmission power from its serving node is dominating over CRS transmission power from the interfering node and the first set is used for ePDCCH transmissions. When UE has a large CRE bias, i.e. when the UE is located further away from the serving node, and CRS transmission power from the interfering node is dominating over CRS transmission power from the serving node, the second set could instead be used for ePDCCH transmissions. Hence, the ePDCCH is mapped around these highly interfering CRS RE associated with the interfering node. The mentioned setup of ePDCCH mapping sets can also be used for dynamically switching between transmitting the ePDCCH from a first node and transmitting the ePDCCH from a second node in general, and not only limited to the described heterogeneous deployment scenario.

According to a first embodiment, in the configuration of an ePDCCH set to the UE, which configuration can be performed by RRC signaling, the signaling may include information of one or more of the following parameters, or equivalent parameters that allow the corresponding REs to be avoided for ePDCCH transmission:

Presence or absence of CRS signals
The number of CRS ports
The CRS frequency shift, v_shift
The ePDCCH start OFDM symbol, or number of ePDCCH symbols, in the subframe, including start symbol zero, i.e. first symbol, in the subframe
Which subframes are configured as Multicast/Broadcast Single Frequency Network, MBSFN, subframes, which impacts on which OFDM symbols that have CRS present
Zero Power, ZP, CSI-RS configuration
Non Zero Power, NZP, CSI-RS configuration An OFDM start symbol, or ePDCCH start OFDM symbol, may be a reference to a start position of an ePDCCH set in a data flow.

When an eNodeB transmits the ePDCCH in a PRB pair in a given subframe, it may map the ePDCCH to the remaining RE when the RE used by the signals configured by the parameters listed above have been removed.

When a UE demodulates an ePDCCH it may likewise assume that the RE used by the signals configured by the parameters listed above have been removed from the RE used by the ePDCCH.

When multiple ePDCCH sets are configured to the UE, each set may have different values of one, some or all of the parameters. Since the UE has some blind decoding candidates in each of its configured ePDCCH sets, the eNodeB can choose, by selecting which set it uses to transmit the ePDCCH message, what mapping it want to use for ePDCCH. The eNodeB could determine this based on information of the interference situation of the UE, based on downlink measurements on CSI-RS. Hence, when the UE is heavily interfered by signals, e.g. CRS, from an adjacent cell, the mapping of ePDCCH is performed around the signals transmitted from the adjacent cell/eNodeB instead of the serving cell/eNodeB.

In a further embodiment a superset of configuration sets, each containing a subset (or all) of the above parameters are signaled to the UE. An ePDCCH set can next be assigned a specific one of said superset of configurations sets.

In yet a further embodiment, said superset of configuration sets may be shared for use relating to decoding/demodulating a data channel, e.g., PDSCH, or another channel, and an ePDCCH. For example, in the scheduling assignment of a PDSCH, one of said set of configuration parameters for the PDSCH can be indicated for the resource element mapping of the ePDCCH. Sharing a superset of configurations between the ePDCCH and the PDSCH has the advantage that the configuration message overhead can be reduced. That a superset of configurations is shared between the ePDCCH and e.g. the PDSCH may be interpreted such that the same configuration parameter values as used for PDSCH are re-used for ePDCCH. For example, the resource elements used by the ePDCCH and the PDSCH within a PRB pair may be the same.

As mentioned, the ePDCCH start symbol in the subframe may be configured by RRC signaling. Each ePDCCH set may have an individual ePDCCH start symbol configuration and the value range may be any or all of the values 0, 1, 2, 3 and 4. Further, the ePDCCH starting symbol may not be dependent on the Physical Control Format Indication Channel, PCFICH.

In a second embodiment, the network dynamically decides from which network node the ePDCCH is to be transmitted from. The network nodes that are candidates for ePDCCH transmission may be associated with different ePDCCH sets, wherein the ePDCCH sets may have mutually different parameters and/or different parameter values. The parameters may be any of the parameters mentioned in connection with the first embodiment. For example, two network nodes with different CRS frequency shifts are the candidates and they are associated with different ePDCCH sets configured to the UE. When ePDCCH is transmitted in the first ePDCCH set, the ePDCCH will be mapped around the CRS used in the first network node, and when ePDCCH is transmitted in the second ePDCCH set, the ePDCCH will be mapped around the CRS used in the second network node. This is one example of dynamic switching of transmitting network node for ePDCCH.

If there are more than two network nodes from which dynamic switching of transmission can take place, network nodes with the same CRS shift can be assigned the same ePDCCH set so that the number of configured sets is minimized.

In a further embodiment, at least one of the network nodes is using a non-backward compatible new carrier, which do not have CRS transmissions and at least one other network node is using a backward compatible carrier, with CRS transmissions and legacy control signaling. In this case ePDCCH mapping in one of the ePDCCH sets would assume no CRS is present and the ePDCCH start symbol would be the first symbol in the subframe. Another ePDCCH set would be configured with CRS present and CRS shift according to either parameter signaling as in the first embodiment or derived from cell ID, and the ePDCCH start symbol would be different than the first ePDCCH symbol, hence corresponding to a backward compatible node.

In a third embodiment, uplink grants and downlink assignments are transmitted from different network nodes, wherein the different network nodes may use mutually different parameters and/or different parameter values. The parameters may be any of the parameters mentioned in connection with the first embodiment. An ePDCCH set is thus associated with a given network node and is configured with the associated parameters that decides the ePDCCH to RE mapping. Hence, uplink grants are transmitted in one ePDCCH set and downlink assignments in another ePDCCH set. This is another example of dynamic switching of transmitting network node for ePDCCH.

When an ePDCCH belonging to a common search space, CSS, is transmitted in an ePDCCH set), the UE advantageously needs to know the configuration of the ePDCCH mapping without having been configured to be able to receive control signals such as random access response messages, paging, and system information. The reason is that these control signals are broadcasted to multiple UEs, which may have different configurations of the parameters listed in connection with the first embodiment. The network does not know the configuration since UE ID is unknown, as in the case of random access response, or the UE has not been configured at all, as in the case of paging in idle mode. Hence a default set of parameters need to be used. CSS is proposed for ePDCCH in LTE Rel-12.

In a further embodiment, the default parameters related to CRS are obtained from the Cell ID of the serving cell and the master information block, MIB, transmitted in the Physical Broadcast Channel, PBCH, following LTE Rel-8 procedure. The ePDCCH start symbol is either using a default value, e.g. the maximum value 3 or 4 at the given system bandwidth, or is obtained by decoding a control format indicator in the Physical Control Format Indicator Channel, PCFICH. The UE can assume that no CSI-RS is present, neither ZP or NZP, and that no MBSFN sub-frames are present.

One or more of the described embodiments provides reduced interference to control signaling when the ePDCCH is used.

Figure 5:
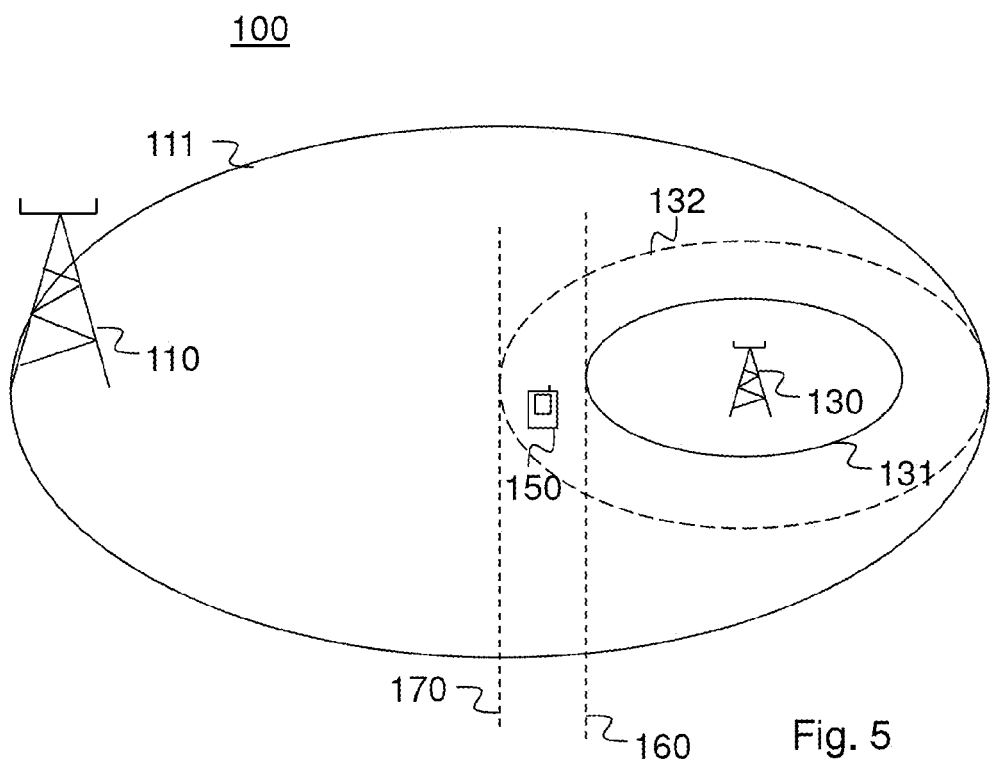
FIG. 5 is a schematic view in perspective of an exemplary wireless communication network in which the present invention may be used.

In FIG. 5, an exemplary wireless communication network is shown in which the present invention may be used. FIG. 5 shows a part of an exemplary heterogeneous network 100 comprising a high power network node 110 covering a high power network node area 111, which may be a macro cell, and a low power network node 130 covering a low power network node area 131, which may be a pico cell. The low power network node area 131 is usually limited to a signal strength, SS, border 160. At the SS border 160, the downlink SS from the high power network node 110 is more or less equal to the downlink SS from the low power network node 130. A UE 150 may be connected to the low power network node 130 if it is positioned inside the low power network node area 131 and connected to the high power network node 110 if it is positioned outside the low power network node area 131 but inside the high power network node area 111. When cell range expansion is employed for the low power network node 130, the low power network node area 131 is extended to include an extended low power network node area 132 limited at a CRE border 170, where SS from the high power node is equal to SS from the low power node added with a bias value When the UE 150 is in the extended low power network node area 132 outside the low power network node area 131 the UE is still connected to the low power node 130 but experiences strong interference from the high power network node 110. If the UE resides in the low power node area 131, according to an embodiment it may be advantageous to map the ePDCCH around signals from the low power network node 130, such as CRS from the low power network node. If the UE resides in the extended low power node area 132 outside the low power node area 131, it may, according to an embodiment, be advantageous to map the ePDCCH around signals from the high power network node 110, such as CRS from the high power network node, since the UE experiences higher interference from the high power node 110 than the low power node 130.

Figure 6:
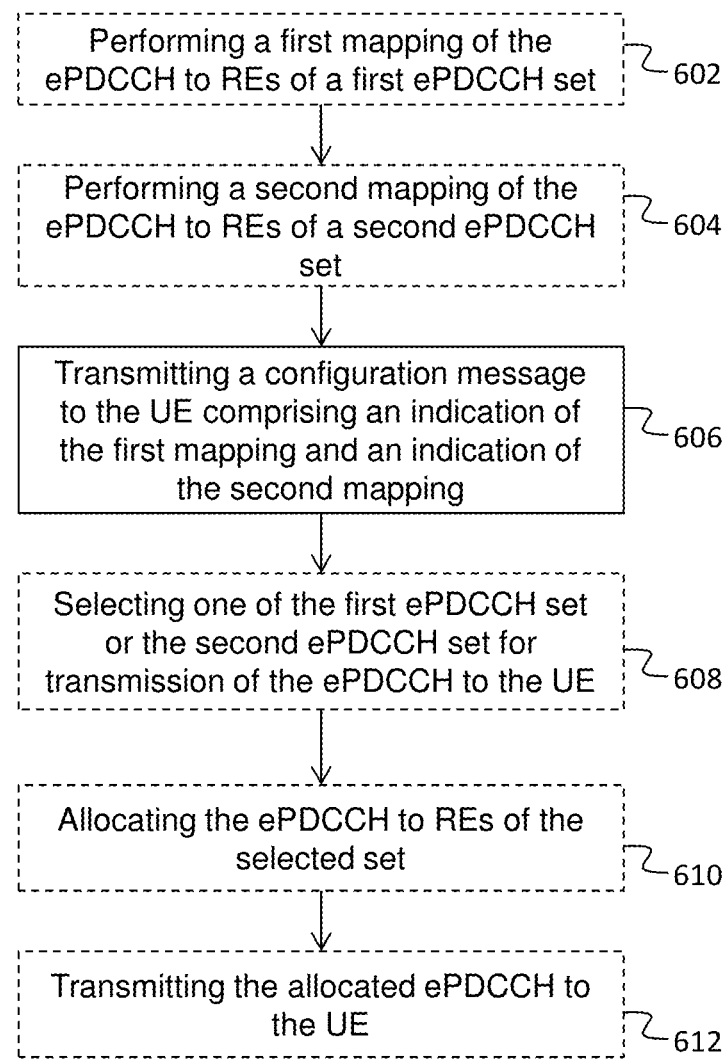
FIG. 6 is a flow chart of a method performed by a network node according to embodiments.

In FIG. 6 an embodiment of a method performed by a network node 130 of a wireless communication network, for communicating an enhanced Physical Downlink Control Channel, ePDCCH, to a UE is described. The method comprises: transmitting 606 a configuration message to the UE. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal. Thereby it is enabled to dynamically map the ePDCCH to the resource elements of the first or the second ePDCCH set.

By transmitting a configuration message to the UE comprising two different ePDCCH mapping sets, it is possible for the network node to dynamically select which of the ePDCCH sets to use when allocating the ePDCCH to REs. The UE has thus been configured to monitor ePDCCH candidates in both ePDCCH sets. Thereby the network node can dynamically select which of the first and the second signal that is to be mapped around, in other words if REs used for the first signal is to be avoided or if REs used for the second signal is to be avoided.

The expression a "first type of signal" may be interpreted as "a first signal" The expression "a second type of signal" may be interpreted as "a second signal. The first type of signal is different from the second type of signal, which means that the first type of signal is a different signal than the second type of signal. The first and the second type of signals may be the same kind of signal, e.g. both may be CRS signals, but then they are different CRS signals.

That the resource elements of the first ePDCCH set are different from resource elements used for a first type of signal means that the resource elements of the first ePDCCH set do not coincide with the resource elements used for the first type of signal. Similarly, the resource elements of the second ePDCCH set are different from resource elements used for a second type of signal means that the resource elements of the second ePDCCH set do not coincide with the resource elements used for the second type of signal. The first type of signal may be transmitted in the same subframe or the same PBR pair as the ePDCCH. The first type of signal may be received at the UE, and possibly also directed to the UE. The second type of signal may be transmitted in the same subframe, or the same PRB pair, as the ePDCCH. The second type of signal may be received at the UE, and possibly also directed to the UE. The second type of signal may be assumed to be different from the first type of signal. The first type of signal and the second type of signal may be any signal or type of signal other than the ePDCCH (signal).

In addition or alternatively, the resource elements of the first ePDCCH set may be different from resource elements used for a first type of signal transmitted from a network node serving the UE, and, the resource elements of the second ePDCCH set may be different from resource elements used for a second type of signal transmitted from a neighboring network node. The serving network node may be a serving eNB providing coverage to a serving cell. The neighboring network node may be a neighboring eNB providing coverage to a neighboring cell. The serving and neighboring network nodes may also be two transmission points within the same cell, such as two remote radio heads. The first type of signals transmitted from the serving network node may be CRS signals. The second type of signals transmitted from the neighboring network node may be CRS signals. The second type of CRS signals may have different frequency shift than the first type of CRS signals. The neighboring network node may be e.g. an eNB of which the transmitted signals interfere with signals from the serving eNB at the UE.

According to an embodiment, at least one resource element belonging to the second ePDCCH set is not part of the resource elements belonging to the first ePDCCH set.

According to an embodiment, the method further comprises performing 602 the first mapping of the ePDCCH to resource elements belonging to the first ePDCCH set, and performing 604 the second mapping of the ePDCCH to resource elements belonging to the second ePDCCH set. The steps of performing 602, 604 the first and the second mapping may be performed before the configuration message with the indication of the first and second mapping is transmitted to the UE. The mapping may be performed by a separate network node or by the same network node as transmits the configuration message.

By the ePDCCH being mapped to resource elements that are different from resource elements used for a first type of signal is meant that the ePDCCH is mapped around the resource elements used for the first type of signal.

By the ePDCCH being mapped to resource elements that are different from resource elements used for a second type of signal, the second signal at least partly using different resource elements than used for the first type of signal is meant that the ePDCCH is mapped around the resource elements used for the second type of signal. Alternatively, the mapping of the first ePDCCH set may be performed by a first network node and the mapping of the second ePDCCH set may be performed by a second network node, different from the first network node. That is, the ePDCCH may be transmitted from different network nodes. This may be achieved through the use of different ePDCCH sets, and the network, e.g. any of the involved network nodes, can decide from which of the first and the second network node the ePDCCH is to be transmitted from on a per subframe basis, by selecting an ePDCCH set out of the first and second ePDCCH set.

According to another embodiment, the configuration message comprises an indication of an ePDCCH start symbol for the first ePDCCH set and an indication of an ePDCCH start symbol for the second ePDCCH set. Thereby, the different ePDCCH sets may be allocated different ePDCCH start symbols which facilitates the dynamic mapping and a diversification of the ePDCCH sets.

According to yet another embodiment, the indicated ePDCCH start symbol is the same start symbol as scheduled for a Packet Data Shared Channel, PDSCH, to be transmitted by the network node. By using the same start symbol for ePDCCH as for PDSCH, less data has to be sent in the configuration message for which reason transmission overhead is decreased.

According to yet another embodiment, one or more of the following configuration parameters: number of Cell-specific Reference Signal, CRS, antenna ports, CRS frequency shift, start position, Multicast/Broadcast Single Frequency Network, MBSFN, subframe configuration, Zero Power Channel State Information Reference Signal, CSI-RS, resource configuration CSI-RS resource configuration, are shared between the ePDCCH and a Packet Data Shared Channel PDSCH. By using the same configuration parameters for ePDCCH as for PDSCH, less data has to be sent in the configuration message for which reason transmission overhead is decreased. For ePDCCH mapping, it may be enough just to send an indication or reference to the PDSCH mapping. Also, the mapping may be performed using less processor capacity.

The expression "one or more configuration parameters are shared between the ePDCCH and the PDSCH" is to be interpreted such that the same parameter values as used for PDSCH are re-used for ePDCCH. For example, the resource elements used by the ePDCCH and the PDSCH within a PRB pair may be the same.

According to yet another embodiment, the method may further comprise selecting 608 one of the first ePDCCH set or the second ePDCCH set for transmission of the ePDCCH to the UE according to a criterion. The method may further comprise allocating 610 the ePDCCH to resource elements according to the selected set. The method may further comprise transmitting 612 the allocated ePDCCH to the UE. Thereby, a dynamic selection of ePDCCH set is realized.

According to yet another embodiment, the first type of signal is a signal from a first network node 110, and the second type of signal is a signal from a second network node 130. The selecting criterion may be which of the signal from the first network node and the signal from the second network node that has the highest signal strength. Thereby it is possible to dynamically map around signals from any of two network nodes, depending on which network node's signal strength is the highest. This may be advantageous in a heterogeneous network using CRE, for example when a UE is moving into and out of the CRE area.

Another possible selection criterion may be to select first or second ePDCCH set depending on type of message to be sent, e.g. depending on whether the message is an Uplink grant message or a Downlink assignment message. For example, if the network node is intended to schedule uplink from the first ePDCCH set and downlink from the second ePDCCH set, the network node will select the first ePDCCH set if the message is an Uplink grant message and the second ePDCCH set if the message is a Downlink assignment message. Another selection criterion may be scheduling of different UEs depending on scheduling priority. For example, for a first UE and a second UE to be scheduled in the same subframe, the first UE may have a higher scheduling priority than the second UE. It may be the best for both the first UE and the second UE to be scheduled from the first ePDCCH set, but since the first UE has a higher scheduling priority than the second UE, the first UE is scheduled from the first ePDCCH set, and the second UE is, consequently, scheduled from the second ePDCCH set. This may be suboptimal for the second UE but from a network perspective it may be advantageous since both the first UE and the second UE may be scheduled in the same subframe.

According to another embodiment, the first network node is an interfering network node 130 and the second network node is the network node 110 performing the method.

According to another embodiment, the first type of signal and the second type of signal is a Cell-specific Reference Signal, CRS. Thereby it is possible to map around CRS signals.

According to another embodiment, the resource elements of the first ePDCCH set comprises information of uplink grants and the resource elements of the second ePDCCH set comprises downlink assignments Uplink grants are scheduling information for uplink transmissions. Downlink assignments are scheduling information for downlink transmissions.

According to another embodiment, the configuration message is transmitted 606 in a Radio Resource Control, RRC message. By using an already existing message, or message structure, for transmitting the configuration message, no or only small changes have to be made to the network node for transmitting the configuration message and to the UE for receiving the configuration message.

Figure 7:
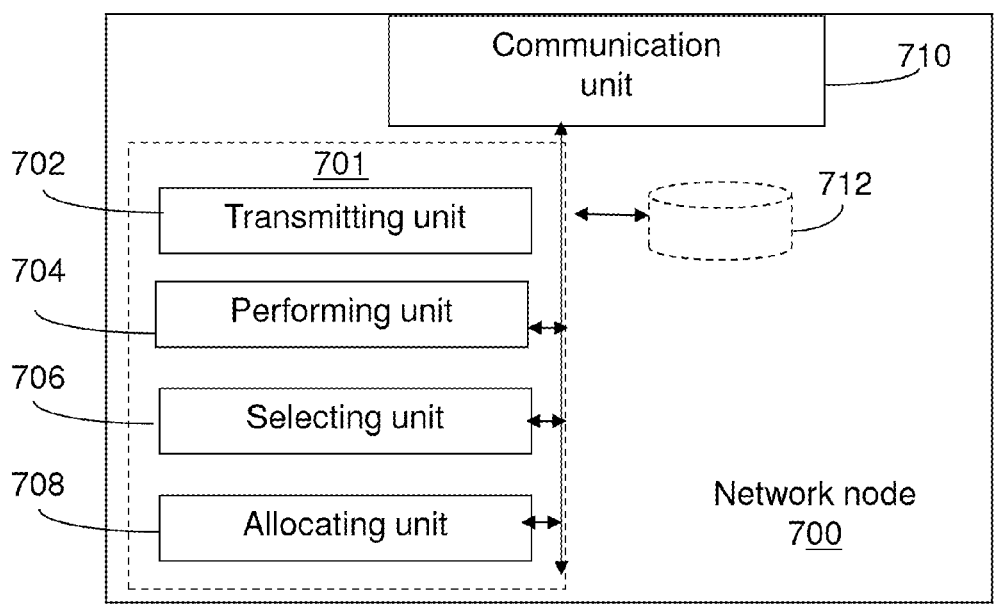
FIG. 7 is a schematic block diagram of a network node according to embodiments.

FIG. 7 shows a network node 700 of a wireless communication network according to an embodiment of the invention, configured for communicating an ePDCCH to a UE. The network node may be an eNodeB B of an LTE network. The network node 700 may be the low-power network node 130 or the high power network node 110 of FIG. 5. The network node 700 comprises a transmitting unit 702 for transmitting a configuration message to the UE. The configuration message comprises an indication of a first mapping of the ePDCCH to resource elements belonging to a first ePDCCH set, where the resource elements of the first ePDCCH set are different from resource elements used for a first type of signal. The configuration message further comprises an indication of a second mapping of the ePDCCH to resource elements belonging to a second ePDCCH set, where the resource elements of the second ePDCCH set are different from resource elements used for a second type of signal, thereby enabling dynamically mapping ePDCCH to the resource elements of the first ePDCCH set or the second ePDCCH set.

The network node 700 may further comprise a communication unit 710, which may be considered to comprise conventional means for communication from and/or to other nodes or UEs of the wireless network. In case the network node 700 is an eNodeB, the communication unit 710 may comprise a wireless communication part for communicating wirelessly with UEs, such as one or more transceivers. The network node 700 may further comprise other functional units (not shown) for providing e.g. regular network node functions. The network node 700 may further comprise one or more storage units 712.

The transmitting unit 702, the performing unit 704 and the selecting unit 706 may be arranged in an arrangement 701. The arrangement 701 could be implemented e.g. by one or more of: a processor or a micro processor and adequate software and storage therefore, a Programmable Logic Device (PLD) or other electronic component(s)/processing circuit(s) configured to perform the actions, or methods, mentioned above.

According to an embodiment, the network node 700 further comprises a performing unit 704 for performing the first mapping of the ePDCCH to resource elements belonging to the first ePDCCH set, and for performing the second mapping of the ePDCCH to resource elements belonging to the second ePDCCH set.

According to another embodiment, the configuration message comprises an indication of an ePDCCH start symbol for the first ePDCCH set and an indication of an ePDCCH start symbol for the second ePDCCH set.

According to another embodiment the indicated ePDCCH start symbol is the same start symbol as scheduled for a Packet Data Shared Channel, PDSCH, to be transmitted by the network node.

According to another embodiment, one or more of the following configuration parameters: number of Cell-specific Reference Signal, CRS, antenna ports, CRS frequency shift, start position, Multicast/Broadcast Single Frequency Network, MBSFN, subframe configuration, Zero Power Channel State Information Reference Signal, CSI-RS, resource configuration CSI-RS resource configuration, are shared between the ePDCCH and a Packet Data Shared Channel PDSCH.

According to another embodiment, the network node 700 further comprises a selecting unit 706 for selecting one of the first ePDCCH set or the second ePDCCH set for transmission of the ePDCCH to the UE according to a criterion. The network node 700 further comprises an allocating unit 708 for allocating the ePDCCH to resource elements according to the selected set. Further, the transmitting unit 702 is arranged to transmit the allocated ePDCCH to the UE.

According to another embodiment, the first type of signal is a signal from a first network node 110, and the second type of signal is a signal from a second network node 130, and wherein the selecting criterion is which of the signal from the first network node and the signal from the second network node that has the highest signal strength.

Figure 8:
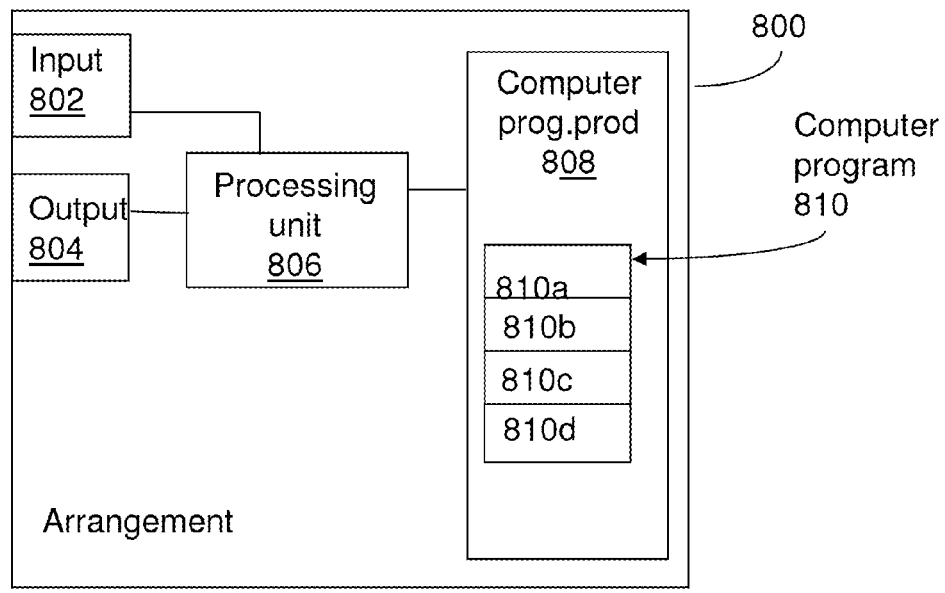
FIG. 8 is a schematic block diagram of an arrangement in a network node according to embodiments.

FIG. 8 schematically shows an embodiment of an arrangement 800 for use in a network node 700, which also can be an alternative way of disclosing an embodiment of the arrangement 701 in a network node 700 illustrated in FIG. 7. Comprised in the arrangement 800 is a processing unit 806, e.g. with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer program product 808 in the form of a non-volatile or volatile memory, e.g. an Electrically Erasable Programmable Read-only Memory (EEPROM), a flash memory, a disk drive or a Random-access memory (RAM). The computer program product 808 comprises a computer program 810, which comprises code means, which when executed in the processing unit 806 in the arrangement 800 causes the arrangement and/or the network node 700 to perform the actions of any of the procedures described earlier in conjunction with FIG. 6.

The computer program 810 may be configured as a computer program code structured in computer program modules. Hence, in an exemplifying embodiment, the code means in the computer program 810 of the arrangement 800 comprises a transmitting module 810*a* for transmitting a configuration message to the UE. The configuration message comprises an indication of a first mapping of the ePDCCH to resource elements belonging to a first ePDCCH set, where the resource elements of the first ePDCCH set are different from resource elements used for a first type of signal, and an indication of a second mapping of the ePDCCH to resource elements belonging to a second ePDCCH set, where the resource elements of the second ePDCCH set are different from resource elements used for a second type of signal, thereby enabling dynamically mapping ePDCCH to the resource elements of the first ePDCCH set or the second ePDCCH set.

The computer program may further comprise a performing module 810*b* for performing the first mapping of the ePDCCH to resource elements belonging to the first ePDCCH set, and for performing the second mapping of the ePDCCH to resource elements belonging to the second ePDCCH set. The computer program may further comprise a selecting module 810*c* for selecting one of the first ePDCCH set or the second ePDCCH set for transmission of the ePDCCH to the UE according to a criterion. The computer program may further comprise an allocating module 810*d* for allocating the ePDCCH to resource elements according to the selected set. Further, the transmitting module 810*a* may be arranged for transmitting the allocated ePDCCH to the UE.

Figure 9:
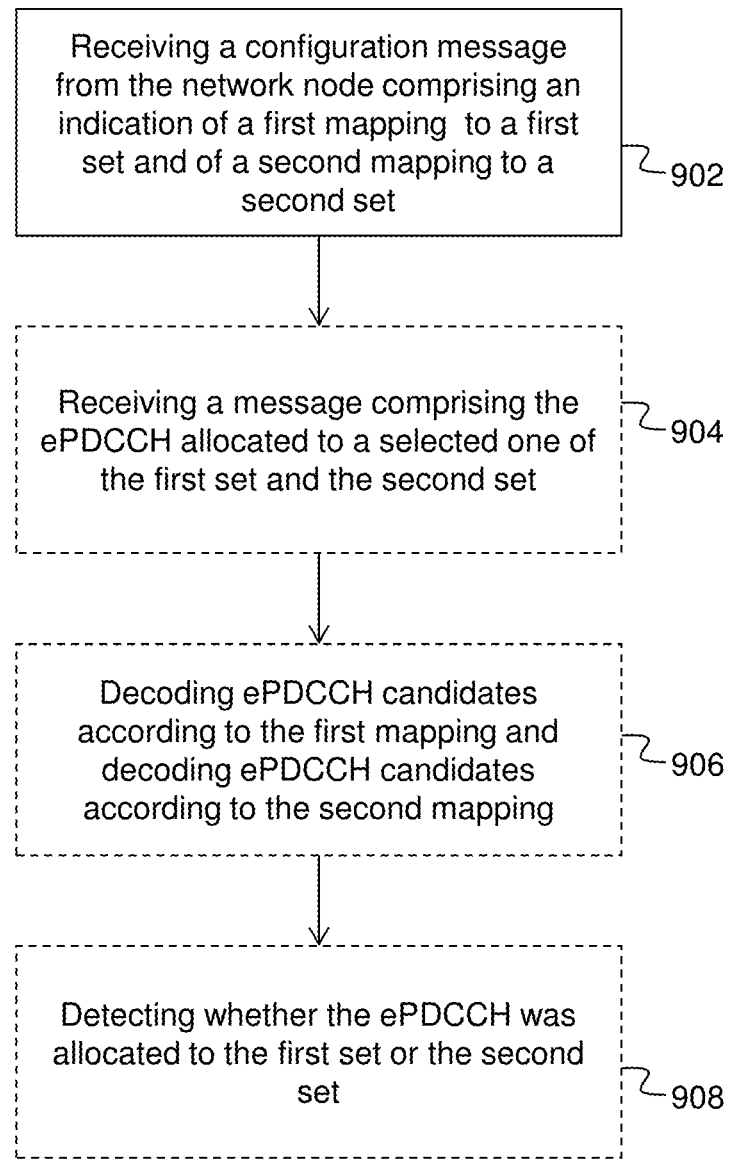
FIG. 9 is a flow chart of a method performed by a UE according to embodiments.

In FIG. 9, a method performed by a UE in a wireless communication network is described, for communicating an ePDCCH, with a network node. The method comprises receiving (902) a configuration message from the network node. The configuration message comprises an indication of a first mapping of the ePDCCH to resource elements belonging to a first ePDCCH set, where the resource elements of the first ePDCCH set are different from resource elements used for a first type of signal, and an indication of a second mapping of the ePDCCH to resource elements belonging to a second ePDCCH set, where the resource elements of the second ePDCCH set are different from resource elements used for a second type of signal. Thereby, it is possible for the UE to detect a later received ePDCCH if transmitted in either of the first ePDCCH set or the second ePDCCH set. This enables dynamic allocation of ePDCCH to REs.

According to an embodiment, the configuration message comprises an indication of an ePDCCH start symbol for the first ePDCCH set and an indication of an ePDCCH start symbol for the second ePDCCH set.

According to another embodiment, the indicated ePDCCH start symbol is the same start symbol as scheduled for a Packet Data Shared Channel, PDSCH, to be transmitted by the network node.

According to another embodiment, one or more of the following configuration parameters: number of Cell-specific Reference Signal, CRS, antenna ports, CRS frequency shift, start position, Multicast/Broadcast Single Frequency Network, MBSFN, subframe configuration, Zero Power Channel State Information Reference Signal, CSI-RS, resource configuration CSI-RS resource configuration, are shared between the ePDCCH and a Packet Data Shared Channel PDSCH.

According to another embodiment, the method further comprises receiving 904 a message from the network node comprising the ePDCCH allocated to a selected one of the first ePDCCH set and the second ePDCCH set. The method further comprises decoding 906 ePDCCH candidates according to the first mapping and decoding ePDCCH candidates according to the second mapping. The method further comprises detecting 908 whether the ePDCCH was allocated to the first ePDCCH set or the second ePDCCH set. The step of detecting 908 may be performed by decoding a number of, for example 3, candidate REs in the first set and a number of candidate REs in the second set. If there is a match the UE knows which of the two sets that was used for the mapping. The UE may further detect whether the message was intended for the UE or not. For this reason, the UE may correlate the 16 CRC bits for each of the decoded candidate REs with its UE identity. If there is a match the UE knows that the ePDCCH message was intended for the UE.

According to an embodiment, the resource elements of the first ePDCCH set comprises information of uplink grants and the resource elements of the second ePDCCH set comprises information of downlink assignments.

According to an embodiment, the configuration message is received (902) in a RRC message.

Figure 10:
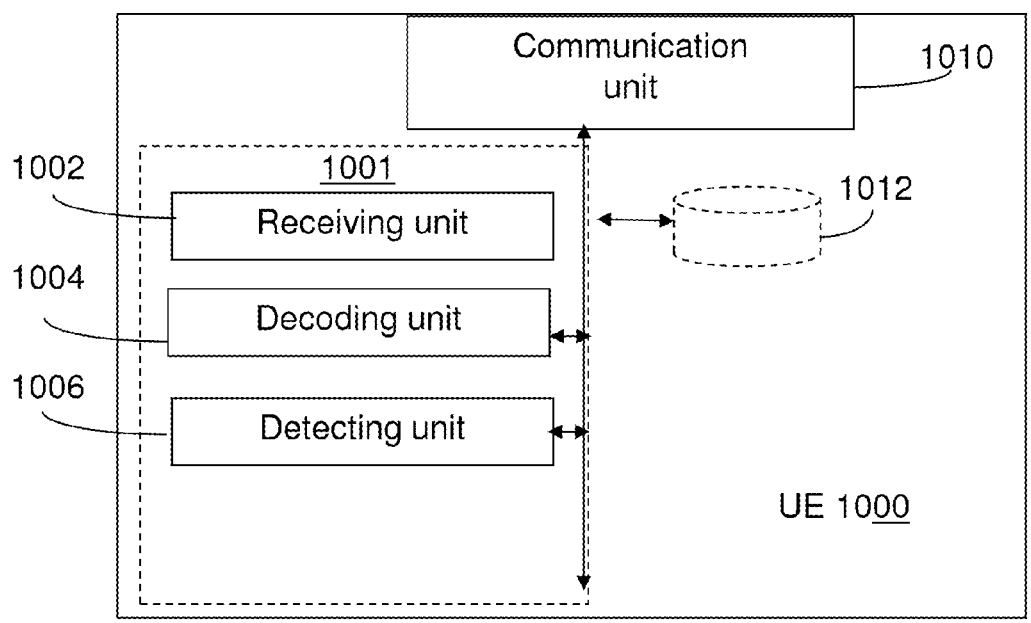
FIG. 10 is a schematic block diagram of a UE according to embodiments.

FIG. 10 shows a UE 1000 in a wireless communication network, configured for communicating an ePDCCH with a network node. The UE 1000 comprises a receiving unit 1002 for receiving a configuration message from the network node. The configuration message comprises an indication of a first mapping of the ePDCCH to resource elements belonging to a first ePDCCH set, where the resource elements of the first ePDCCH set are different from resource elements used for a first type of signal, and an indication of a second mapping of the ePDCCH to resource elements belonging to a second ePDCCH set, where the resource elements of the second ePDCCH set are different from resource elements used for a second type of signal.

The UE 1000 may further comprise a communication unit 1010, which may be considered to comprise conventional means for communication from and/or to network nodes, such as eNodeBs, of the wireless network. The communication unit 1010 may comprise a wireless communication part for communicating wirelessly with network nodes, such as one or more transceivers. The UE 1000 may further comprise other functional units (not shown) for providing e.g. regular network node functions. The UE 1000 may further comprise one or more storage units 1012.

The receiving unit 1002, the decoding unit 1004 and the detecting unit 1006 may be arranged in an arrangement 1001. The arrangement 1001 could be implemented e.g. by one or more of: a processor or a micro processor and adequate software and storage therefore, a Programmable Logic Device (PLD) or other electronic component(s)/processing circuit(s) configured to perform the actions, or methods, mentioned above.

According to an embodiment, the configuration message comprises an indication of an ePDCCH start symbol for the first ePDCCH set and an indication of an ePDCCH start symbol for the second ePDCCH set.

According to another embodiment, the indicated ePDCCH start symbol is the same start symbol as scheduled for a Packet Data Shared Channel, PDSCH, to be transmitted by the network node.

According to another embodiment, one or more of the following configuration parameters: number of Cell-specific Reference Signal, CRS, antenna ports, CRS frequency shift, start position, Multicast/Broadcast Single Frequency Network, MBSFN, subframe configuration, Zero Power Channel State Information Reference Signal, CSI-RS, resource configuration CSI-RS resource configuration, are shared between the ePDCCH and a Packet Data Shared Channel PDSCH.

According to another embodiment, the receiving unit 1002 is further arranged to receive a message from the network node comprising the ePDCCH allocated to a selected one of the first ePDCCH set and the second ePDCCH set. The UE 1000 further comprises a decoding unit 1004 for decoding ePDCCH candidates according to the first mapping and for decoding ePDCCH candidates according to the second mapping. The UE 1000 further comprises a detecting unit 1006 for detecting whether the ePDCCH was allocated to the first ePDCCH set or to the second ePDCCH set.

According to another embodiment, the resource elements of the first ePDCCH set comprises information of uplink grants and the resource elements of the second ePDCCH set comprises information of downlink assignments.

According to another embodiment, the receiving unit 1002 is further arranged to receive the configuration message in a RRC message.

Figure 11:
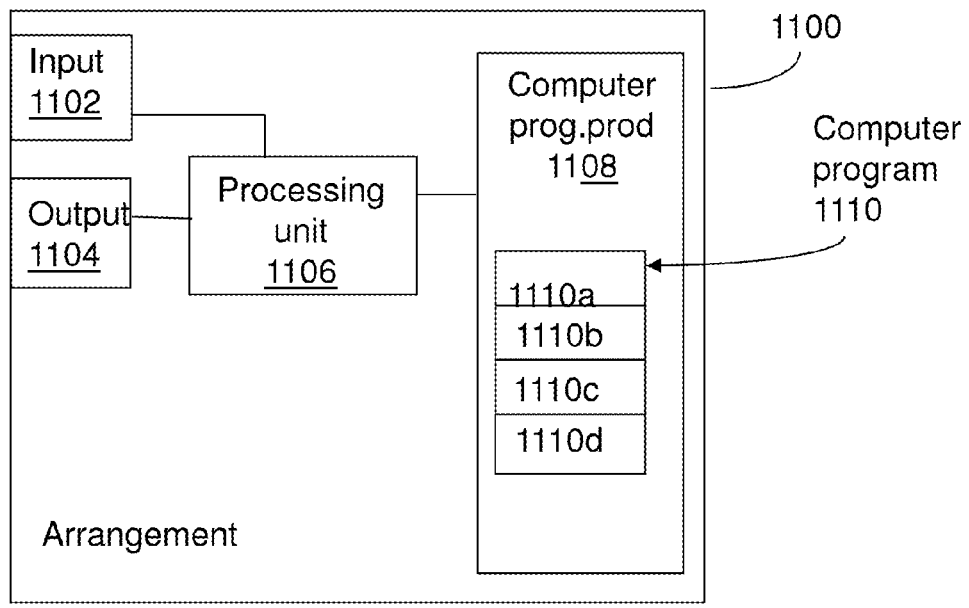
FIG. 11 is a schematic block diagram of an arrangement in a UE according to embodiments.

FIG. 11 schematically shows an embodiment of an arrangement 1100 for use in a UE 1000, which also can be an alternative way of disclosing an embodiment of the arrangement 1001 in the UE 1000 illustrated in FIG. 10. Comprised in the arrangement 1100 is a processing unit 1106, e.g. with a Digital Signal Processor (DSP). The processing unit 1106 may be a single unit or a plurality of units to perform different actions of procedures described herein. The arrangement 1100 may also comprise an input unit 1102 for receiving signals from other entities, and an output unit 1104 for providing signal(s) to other entities. The input unit 1102 and the output unit 1104 may be arranged as an integrated entity.

Furthermore, the arrangement 1100 comprises at least one computer program product 1108 in the form of a non-volatile or volatile memory, e.g. an Electrically Erasable Programmable Read-only Memory (EEPROM), a flash memory, a disk drive or a Random-access memory (RAM). The computer program product 1108 comprises a computer program 1110, which comprises code means, which when executed in the processing unit 1106 in the arrangement 1100 causes the arrangement and/or the UE 1000 to perform the actions of any of the procedures described earlier in conjunction with FIG. 9.

The computer program 1110 may be configured as a computer program code structured in computer program modules. Hence, in an exemplifying embodiment, the code means in the computer program 1110 of the arrangement 1100 comprises a receiving module 1110a for receiving a configuration message from a network node, the configuration message comprising an indication of a first mapping of the ePDCCH to resource elements belonging to a first ePDCCH set, where the resource elements of the first ePDCCH set are different from resource elements used for a first type of signal, and an indication of a second mapping of the ePDCCH to resource elements belonging to a second ePDCCH set, where the resource elements of the second ePDCCH set are different from resource elements used for a second type of signal.

The computer program may further comprise a second receiving module 1110b for receiving a message from the network node comprising the ePDCCH allocated to a selected one of the first ePDCCH set and the second ePDCCH set. The UE computer program may further comprise a decoding module 1110c for decoding ePDCCH candidates according to the first mapping and for decoding ePDCCH candidates according to the second mapping. The computer program may further comprise a detecting module 1110d for detecting whether the ePDCCH was allocated to the first ePDCCH set or to the second ePDCCH set.

Figure 12:
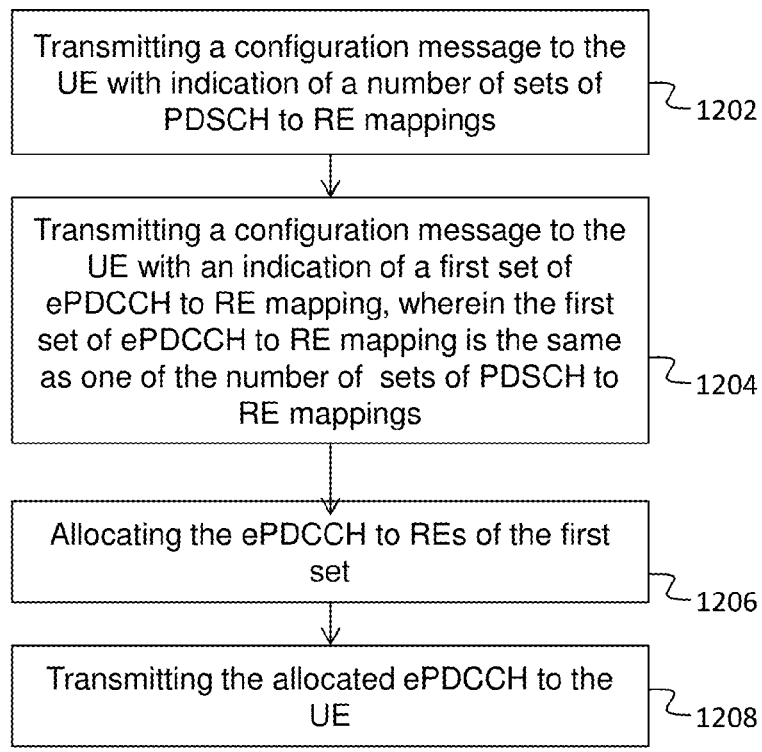
FIG. 12 is a flow chart of a method in a network node.

FIG. 12 described a method performed by a network node of a wireless communication network, for communicating an ePDCCH, to a UE. The method comprises transmitting 1202 a configuration message to the UE with indication of a number of sets of PDSCH to RE mappings. The method further comprises transmitting 1204 a configuration message to the UE with an indication of a first set of ePDCCH to RE mapping, wherein the first set of ePDCCH to RE mapping is the same as one of the number of sets of PDSCH to RE mappings. The method further comprises allocating 1206 the ePDCCH to REs of the first set. The method further comprises transmitting 1208 the allocated ePDCCH to the UE.

Figure 13:
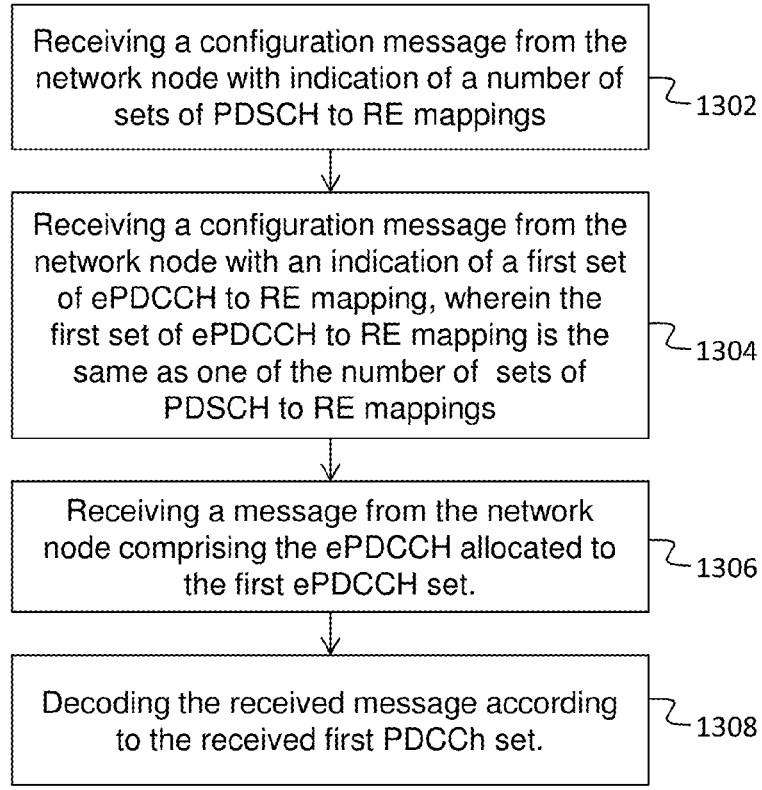
FIG. 13 is a flow chart of a method in a UE.

FIG. 13 described a method performed by a UE of a wireless communication network, for communicating an ePDCCH with a network node. The method comprises receiving 1302 a configuration message from the network node with an indication of a number of sets of PDSCH to RE mappings. The method further comprises receiving 1304 a configuration message from the network node with an indication of a first set of ePDCCH to RE mapping, wherein the first set of ePDCCH to RE mapping is the same as one of the number of sets of PDSCH to RE mappings. The method further comprises receiving 1306 a message from the network node comprising the ePDCCH allocated to the first ePDCCH set The method further comprises decoding 1308 the received message according to the received first ePDCCH set.

The invention has been described in connection with two different mappings and two different ePDCCH sets. Of course it is possible to also use more than two different mappings and more than two different ePDCCH sets.

It will be appreciated by the person of skill in the art that various modifications may be made to the above described embodiments without departing from the scope of the present invention. For example, it will be readily appreciated that although the above embodiments are described with reference to parts of an LTE network, embodiments of the present invention will also be applicable to like networks, such as a successor of the LTE network, having like functional components, or a WiMax (IEEE 802.16) network. Therefore, in particular, the terms LTE and associated or related terms used in the above description and in the enclosed drawings and any appended claims now or in the future are to be interpreted accordingly.

In the discussion, specific details of particular embodiments of the present invention have been set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface have been described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

The invention claimed is:

1. A method, performed by a network node of a wireless communication network, for communicating an enhanced Physical Downlink Control Channel (ePDCCH) to a user equipment (UE), the method comprising
   transmitting a configuration message to the UE, the configuration message comprising:
      an indication of a first mapping of the ePDCCH to resource elements belonging to a first ePDCCH set, where the resource elements of the first ePDCCH set are different from resource elements used for a first type of signal,
      an indication of an ePDCCH start symbol for the first ePDCCH set,
      an indication of a second mapping of the ePDCCH to resource elements belonging to a second ePDCCH set, where the resource elements of the second ePDCCH set are different from resource elements used for a second type of signal, and
      an indication of an ePDCCH start symbol for the second ePDCCH set;
   selecting one of the first ePDCCH set or the second ePDCCH set for transmission of the ePDCCH to the UE according to a selection criterion;
   allocating the ePDCCH to resource elements according to the selected set; and
   transmitting the allocated ePDCCH to the UE.

2. The method of claim 1, further comprising:
   performing the first mapping of the ePDCCH to resource elements belonging to the first ePDCCH set; and
   performing the second mapping of the ePDCCH to resource elements belonging to the second ePDCCH set.

3. The method of claim 1, wherein the indicated ePDCCH start symbol for the first eDPCCH set is the same start symbol as scheduled for a Packet Data Shared Channel (PDSCH) to be transmitted by the network node or another network node.

4. The method of claim 1, wherein one or more of the following configuration parameters are shared between the ePDCCH and a Packet Data Shared Channel (PDSCH): a number of Cell-specific Reference Signal (CRS) antenna ports, a CRS frequency shift, a start position, a Multicast/Broadcast Single Frequency Network (MBSFN) subframe configuration, a Zero Power Channel State Information Reference Signal resource configuration, and a Channel State Information Reference Symbol (CSI-RS) resource configuration.

5. The method of claim 1, wherein the first type of signal is a signal from a first network node, and the second type of signal is a signal from a second network node, and wherein the selection criterion is based upon whether the signal from the first network node or the signal from the second network node has the highest signal strength.

6. The method of claim 5, wherein the first network node is the network node performing the method and the second network node is an interfering network node.

7. The method of claim 1, wherein the first type of signal and the second type of signal is a Cell-specific Reference Signal (CRS).

8. The method of claim 1, wherein the resource elements of the first ePDCCH set carry information of uplink grants and the resource elements of the second ePDCCH set carry information of downlink assignments.

9. The method of claim 1, wherein the configuration message is transmitted in a Radio Resource Control (RRC) message.

10. A network node of a wireless communication network, configured for communicating an enhanced Physical Downlink Control Channel (ePDCCH) to a user equipment (UE), the network node comprising
 a transmitting circuit adapted to transmit a configuration message to the UE, the configuration message comprising:
  an indication of a first mapping of the ePDCCH to resource elements belonging to a first ePDCCH set, where the resource elements of the first ePDCCH set are different from resource elements used for a first type of signal;
  an indication of an ePDCCH start symbol for the first ePDCCH set;
  an indication of a second mapping of the ePDCCH to resource elements belonging to a second ePDCCH set, where the resource elements of the second ePDCCH set are different from resource elements used for a second type of signal; and
  an indication of an ePDCCH start symbol for the second ePDCCH set;
 a selecting circuit adapted to select one of the first ePDCCH set or the second ePDCCH set for transmission of the ePDCCH to the UE according to a selection criterion; and
 an allocating circuit adapted to allocate the ePDCCH to resource elements according to the selected set,
 wherein the transmitting circuit is further arranged to transmit the allocated ePDCCH to the UE.

11. The network node of claim 10, further comprising a performing circuit adapted to perform the first mapping of the ePDCCH to resource elements belonging to the first ePDCCH set and to perform the second mapping of the ePDCCH to resource elements belonging to the second ePDCCH set.

12. The network node of claim 10, wherein the indicated ePDCCH start symbol for the first eDPCCH set is the same start symbol as scheduled for a Packet Data Shared Channel (PDSCH) to be transmitted by the network node or another network node.

13. The network node of claim 10, wherein one or more of the following configuration parameters are shared between the ePDCCH and a Packet Data Shared Channel (PDSCH): a number of Cell-specific Reference Signal (CRS) antenna ports, a CRS frequency shift, a start position, a Multicast/Broadcast Single Frequency Network (MBSFN) subframe configuration, a Zero Power Channel State Information Reference Signal resource configuration, and a Channel State Information Reference Symbol (CSI-RS) resource configuration.

14. The network node of claim 10, wherein the first type of signal is a signal from a first network node, and the second type of signal is a signal from a second network node, and wherein the selection criterion is based upon whether the signal from the first network node or the signal from the second network node has the highest signal strength.

15. A method, performed by a user equipment (UE) in a wireless communication network, for communicating an enhanced Physical Downlink Control Channel (ePDCCH) with a network node, the method comprising:
 receiving a configuration message from the network node, the configuration message comprising:
  an indication of a first mapping of the ePDCCH to resource elements belonging to a first ePDCCH set, where the resource elements of the first ePDCCH set are different from resource elements used for a first type of signal,
  an indication of an ePDCCH start symbol for the first ePDCCH set,
  an indication of a second mapping of the ePDCCH to resource elements belonging to a second ePDCCH set, where the resource elements of the second ePDCCH set are different from resource elements used for a second type of signal, and
  an indication of an ePDCCH start symbol for the second ePDCCH set;
 receiving a message from the network node comprising an ePDCCH allocated to a selected one of the first ePDCCH set and the second ePDCCH set;
 decoding ePDCCH candidates according to the first mapping and decoding ePDCCH candidates according to the second mapping;
 detecting whether the ePDCCH was allocated to the first ePDCCH set or the second ePDCCH set.

16. The method of claim 15, wherein the indicated ePDCCH start symbol for the first eDPCCH set is the same start symbol as scheduled for a Packet Data Shared Channel (PDSCH) to be transmitted by the network node or another network node.

17. The method of claim 15, wherein one or more of the following configuration parameters are shared between the ePDCCH and a Packet Data Shared Channel (PDSCH): a number of Cell-specific Reference Signal (CRS) antenna ports, a CRS frequency shift, a start position, a Multicast/Broadcast Single Frequency Network (MBSFN) subframe configuration, a Zero Power Channel State Information Reference Signal resource configuration, and a Channel State Information Reference Symbol (CSI-RS) resource configuration.

18. The method of claim 15, wherein the resource elements of the first ePDCCH set comprises information of uplink grants and the resource elements of the second ePDCCH set comprises information of downlink assignments.

19. The method of claim 15, wherein the configuration message is received in a Radio Resource Control (RRC) message.

20. A user equipment (UE) in a wireless communication network, configured for communicating an enhanced Physical Downlink Control Channel (ePDCCH) with a network node, the UE comprising:
 a receiving circuit adapted to receive:
  a configuration message from the network node, the configuration message comprising an indication of a first mapping of the ePDCCH to resource elements belonging to a first ePDCCH set, where the resource elements of the first ePDCCH set are different from resource elements used for a first type of signal, and an indication of a second mapping of the ePDCCH to resource elements belonging to a second ePDCCH set, where the resource elements of the second ePDCCH set are different from resource elements used for a second type of signal, and wherein the configuration message comprises an indication of an ePDCCH start symbol for the first ePDCCH set and an indication of an ePDCCH start symbol for the second ePDCCH set, and
a message from the network node comprising an ePDCCH allocated to a selected one of the first ePDCCH set and the second ePDCCH set;
a decoding circuit adapted to decode ePDCCH candidates according to the first mapping and to decode ePDCCH candidates according to the second mapping; and
a detecting circuit adapted to detect whether the ePDCCH was allocated to the first ePDCCH set or to the second ePDCCH set.

21. The UE of claim 20, wherein the indicated ePDCCH start symbol for the first eDPCCH set is the same start symbol as scheduled for a Packet Data Shared Channel (PDSCH) to be transmitted by the network node or another network node.

22. The UE of claim 20, wherein one or more of the following configuration parameters are shared between the ePDCCH and a Packet Data Shared Channel (PDSCH): a number of Cell-specific Reference Signal (CRS) antenna ports, a CRS frequency shift, a start position, a Multicast/Broadcast Single Frequency Network (MBSFN) subframe configuration, a Zero Power Channel State Information Reference Signal resource configuration, and a Channel State Information Reference Symbol (CSI-RS) resource configuration.

23. The UE of claim 20, wherein the resource elements of the first ePDCCH set carry information of uplink grants and the resource elements of the second ePDCCH set carry information of downlink assignments.

24. The UE of claim 20, wherein the receiving unit is further arranged to receive the configuration message in a Radio Resource Control (RRC) message.

* * * * *

UNITED STATES PATENT AND TRADEMARK OFFICE
CERTIFICATE OF CORRECTION

PATENT NO. : 9,913,259 B2
APPLICATION NO. : 13/885520
DATED : March 6, 2018
INVENTOR(S) : Eriksson et al.

It is certified that error appears in the above-identified patent and that said Letters Patent is hereby corrected as shown below:

On the Title Page

In Item (57), under "ABSTRACT", in Column 2, Line 5, delete "eDPCCH" and insert -- ePDCCH --, therefor.

In Item (57), under "ABSTRACT", in Column 2, Line 6, delete "eDPCCH set and a second eDPCCH" and insert -- ePDCCH set and a second ePDCCH --, therefor.

In Item (57), under "ABSTRACT", in Column 2, Line 7, delete "eDPCCH" and insert -- ePDCCH --, therefor.

On Page 2, in Item (57), under "ABSTRACT", in Column 1, Line 1, delete "eDPCCH" and insert -- ePDCCH --, therefor.

On Page 2, in Item (57), under "ABSTRACT", in Column 1, Line 3, delete "eDPCCH" and insert -- ePDCCH --, therefor.

In the Specification

In Column 9, Line 67, delete "set)," and insert -- set, --, therefor.

In Column 11, Line 24, delete "signal'"" and insert -- signal". --, therefor.

In the Claims

In Column 20, Line 15, in Claim 1, delete "comprising" and insert -- comprising: --, therefor.

In Column 20, Line 45, in Claim 3, delete "eDPCCH" and insert -- ePDCCH --, therefor.

Signed and Sealed this
Fifteenth Day of May, 2018

Andrei Iancu
*Director of the United States Patent and Trademark Office*

CERTIFICATE OF CORRECTION (continued)
U.S. Pat. No. 9,913,259 B2

In Column 21, Line 15, in Claim 10, delete "comprising" and insert -- comprising: --, therefor.

In Column 22, Line 30, in Claim 16, delete "eDPCCH" and insert -- ePDCCH --, therefor.